(12) United States Patent
Olsson et al.

(10) Patent No.: US 6,484,823 B2
(45) Date of Patent: Nov. 26, 2002

(54) ROCK DRILL BIT AND A CHECK VALVE THEREFOR

(75) Inventors: Urban Olsson, Forsbacka (SE); Rune Sandén, Sandviken (SE)

(73) Assignee: Sandvik AB, Sandviken (SE)

( * ) Notice: Subject to any disclaimer, the term of this patent is extended or adjusted under 35 U.S.C. 154(b) by 0 days.

(21) Appl. No.: 09/834,908

(22) Filed: Apr. 16, 2001

(65) Prior Publication Data

US 2001/0040055 A1 Nov. 15, 2001

(30) Foreign Application Priority Data

Apr. 14, 2000 (SE) .............................................. 0001434

(51) Int. Cl.[7] .............................................. E21B 10/18
(52) U.S. Cl. ........................ 175/337; 175/339; 251/241
(58) Field of Search ................................ 175/337, 339, 175/340, 331, 393; 408/60; 251/241

(56) References Cited

U.S. PATENT DOCUMENTS

| 3,089,551 A | | 5/1963 | Greene |
| 3,685,601 A | | 8/1972 | Hollingshead |
| 4,080,091 A | * | 3/1978 | Hollingshead ................ 408/60 |
| 4,184,554 A | | 1/1980 | Levefelt |
| 4,457,384 A | | 7/1984 | Layton |
| 4,514,097 A | * | 4/1985 | Daly ............................ 384/93 |
| 4,537,384 A | * | 8/1985 | Petersen et al. ............... 251/83 |
| 4,763,736 A | * | 8/1988 | Varel, Sr. ..................... 175/341 |

* cited by examiner

*Primary Examiner*—Frank S. Tsay
(74) *Attorney, Agent, or Firm*—Burns, Doane, Swecker & Mathis, LLP

(57) ABSTRACT

A rock-crushing rotary drill bit includes a body having a rock-crushing roller rotatably mounted thereon by bearings. The body includes a first flushing channel for conducting flushing fluid to flush the bearings, and a second flushing channel for discharging flushing medium outside of the bit body to flush away cuttings. The second flushing channel terminates in a discharge recess which defines a linear center axis. A nozzle is disposed at a downstream end of the discharge recess, and a valve element is disposed at an upstream end of the discharge recess. The valve element is spring-biased for closing the discharge recess, the valve element being openable against the spring bias in response to a sufficient pressure build-up of flushing medium within the second flushing channel. The valve element includes a guide structure for guiding the valve element for linear movement along the center axis of the discharge recess.

17 Claims, 3 Drawing Sheets

ROCK DRILL BIT AND A CHECK VALVE THEREFOR

This application is based on and claims priority of Swedish Patent Application No. 0001434-0, filed Apr. 14, 2000, the disclosure of which is incorporated by reference herein.

BACKGROUND OF THE INVENTION

The present invention relates to a rock-crushing rotary drill bit and a check valve therefor.

PRIOR ART

The placement of one or more nozzle-carrying passageways in a rotary drilling bit to conduct air or other drilling fluids from the central bore of the bit to the rotating cutters is well known. The drilling fluid thus directed serves to cool the cutters and to carry cuttings away from the cutters. However, the presence of these passageways makes it possible for cuttings and other foreign materials to enter the interior of the bit through the nozzle(s) when the circulation of the drilling fluid ceases and thus to impair the further operation of the bit, e.g., foul the bearings of the bit. This problem has been dealt with by placing check valves or filters in the interior bore and passageways of rotary drill bits. A drawback of such prior rotary drill bits is that fluid may still rise upwardly into the drill bit through the nozzle if the surrounding pressure during drilling is greater than the pressure in the drill bit, for example when the flow of flushing medium is terminated during the addition of additional sections of the drilling string.

In U.S. Pat. No. 3,685,601 that problem has been dealt with by means of a check valve positioned in the nozzle itself. The check valve comprises a spring-loaded closure plate hingedly mounted in a hollow body that forms part of the nozzle. The hinged closure plate opens and closes in an oscillating manner in the channel of the nozzle dependent on the direction of the flushing medium. Use of this type of hinged check valve has been insufficient due to premature breakages, e.g., due to metallic fatigue of the hinge.

Other prior art rotary drill bits shown in U.S. Pat. Nos. 4,457,384 and 3,089,551 are exemplary of check valves positioned in the central bore of the bit at the level of the external conical thread of the bit, thus allowing dirt to enter the bit.

SUMMARY AND OBJECTS OF THE INVENTION

One object of the present invention is to provide a rotary drill bit, which enjoys the advantages associated with prior techniques.

Another object of the present invention is to provide a rotary drill bit, which has an extended life.

Still another object of the present invention is to provide a rotary drill bit, which has a check valve with an inertia such that the bearing of the drill bit is flushed substantially clean before drilling is resumed.

Still another object of the present invention is to provide a rotary drill bit, which has a robust check valve that does not break due to metallic fatigue.

Still another object of the present invention is to provide a rotary drill bit, which minimizes the formation of cavitation in the flow of flushing fluid and thus reduces blasting damage.

A rock-crushing rotary drill bit comprises a body forming at least one leg, and a rotatable roller rotatably mounted on the at least one leg by bearings. The roller includes rock-crushing elements. The body further includes an external thread adapted for connecting the roller to a drill tube. A main channel in the body conducts flushing medium. A first flushing channel passes through the leg and communicates with the main channel for conducting part of the flushing medium to flush the bearings. A second flushing channel communicates with the main channel and includes a discharge recess for discharging another part of the flushing medium. The flushing recess defines a linear center axis. A nozzle is disposed at a downstream end of the discharge recess for directing flushing medium in a direction to flush away cuttings. A valve element is disposed at an upstream end of the discharge recess and includes a guide structure for guiding the valve element for linear movement along the center axis. The valve element is spring-biased to a closed state for closing the discharge passage, and is yieldable in response to fluid medium pressure acting thereagainst, for opening the discharge recess.

The invention is also directed to a check valve per se, wherein the valve element, and biasing spring, are mounted within a house that carries the nozzle at one end thereof.

BRIEF DESCRIPTION OF THE DRAWINGS

The objects and advantages of the invention will become apparent from the following detailed description of preferred embodiments thereof in connection with the accompanying drawings, in which.

DETAILED DESCRIPTION OF PREFERRED EMBODIMENTS OF THE INVENTION

Figure 1:
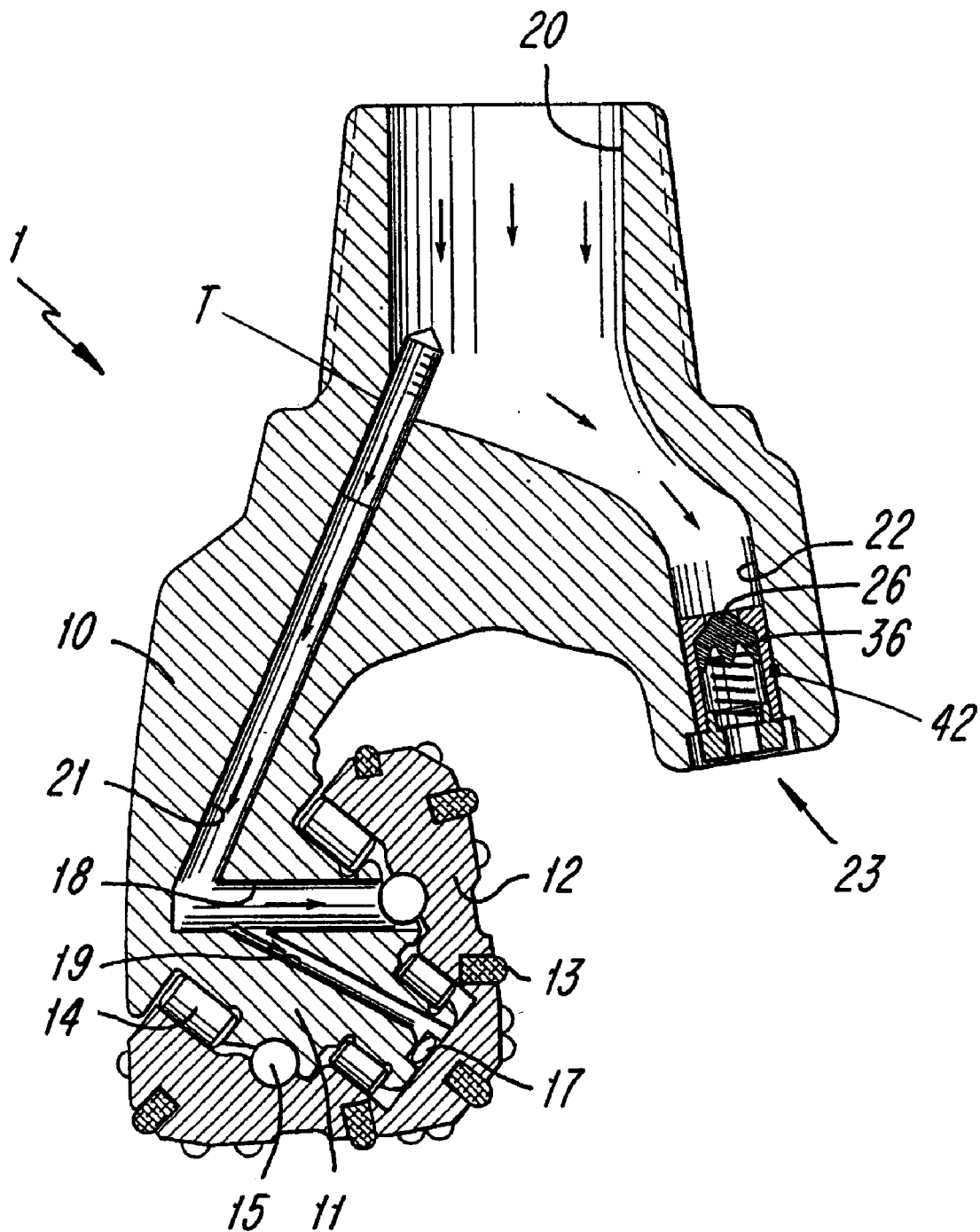
FIG. 1 shows a rotary drill bit according to the present invention in an axial cross-section.

With reference to FIG. 1 a rock drill bit according to the present invention is shown, for rotary crushing drilling of rock, i.e., a so-called roller cone drill bit 1. The drill bit 1 usually comprises three legs 10 on which journals 11 have been formed. In some designs of drill bits it is possible to provide only one or two legs. On each bearing journal there is provided a roller 12 having buttons 13, said roller being rotatably mounted by means of: a cylinder bearing 14, a system of roller bearings 15, a radial bearing 16, as well as an axial bearing 17. The buttons may alternatively be replaced by crushing means other than buttons, such as chisels, or teeth integrated with the roller. If multiple legs 11 are provided, they are evenly distributed with a 120° partition along the circumference of the drill bit. The bearing journal 11 is provided with a channel 18 for insertion of bearing balls 15, in which a stopper, not shown, is received for retaining the separate balls 15. A channel 19 is connected to a channel 18 for flushing the axial bearing 17. The cylinder bearing 14 receives a large portion of the force of reaction from the rock while the principal function of the roller bearing 15 is to retain the rollers 12 on the journal 11.

The drill bit is provided with channels for conducting a flushing medium, e.g., pressurized air with an addition of liquid, intended for cooling and cleaning of the bearing system. The drill bit 1 comprises a central channel 20, which is surrounded by an external conical thread for connection to a drill tube, not shown. The central channel 20 connects to a first channel 21 in the leg 10 and partly to a second channel 22. A tube T is provided in the extension of the first channel 21 for preventing liquid in the flushing medium from entering into the bearing system.

The second channel 22 is intended to direct the pressurized air in the flushing medium towards the roller 12 and the bottom of the hole being drilled, for blowing away drill cuttings during drilling. When the supply of flushing medium is terminated (e.g., when adding new sections of drill string), external fluid might enter the channel 22 and foul the bearings. To prevent external fluid and drill cuttings from entering the drill bit, there is provided according to a first embodiment of the present invention a nozzle-carrying check valve 23 in the second channel 22.

Figure 2:
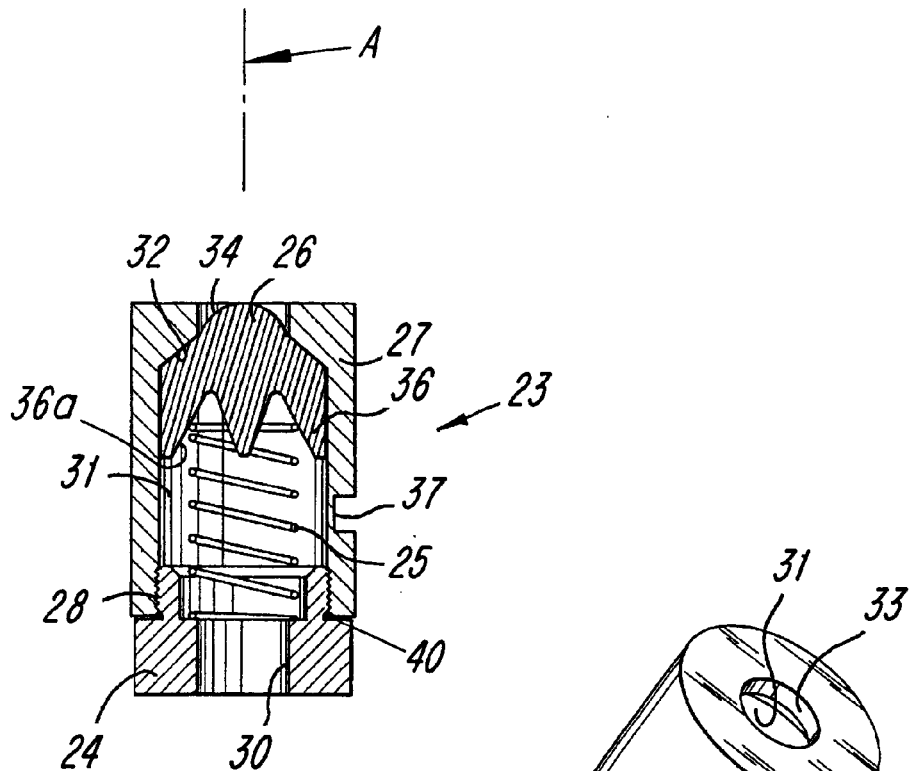
FIG. 2 shows a check valve according to the present invention in the rotary drill bit in magnification.
Figure 3:
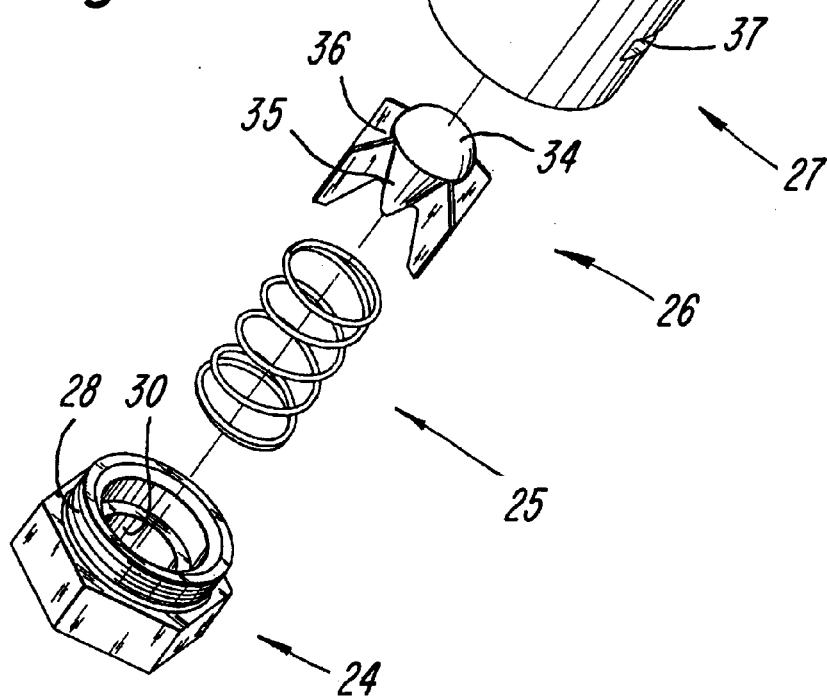
FIG. 3 shows an exploded view of the check valve in a perspective view.

The check valve 23, see FIGS. 2 and 3 foremost, comprises a nozzle 24, a spring 25, a valve element or stopper 26 and a cylindrical hollow house 27. The nozzle 24 is formed as a hollow screw with an externally threaded stem 28. The nozzle 24 has a through-going hole 30 provided to discharge fluid, which hole is enlarged adjacent the stem 28 to form a reaction shoulder for the spring 25. It is possible to replace the nozzle 24 with another nozzle having a larger hole 30 for more airflow but less velocity, or with a nozzle having a smaller hole 30 for less airflow but higher velocity. The spring 25 is a conventional coiled spring.

The house 27 has an internal discharge recess 31, one end of which is internally threaded and the other end of which comprises a conical seat 32 connected to a hole 33. The valve element 26, which preferably is made of plastics, is kept against the seat 32 by means of the spring 25 such that the element 26 will seal against the flow of fluid in an inward direction, i.e., from the hole 30 towards the second channel 22. The element 26 includes a center portion that defines a longitudinal center axis. At one longitudinal end, the center portion comprises a substantially semi-spherical top 34 that translates into a conical portion 35 that forms an opposite end of the center portion. The conical portion 35 has a tip pointing towards the nozzle 24. In addition, the element 26 has four guide wings 36 with 90° partition between one another. The wings project radially outwardly as well as rearwardly from the transition between the top 34 and the cone 35. The wings 36 are relatively thin and serve to center the cone in the recess 31, since the greatest diametrical distance between the outer edges of opposing wings is only somewhat smaller than the diameter of the recess 31. The diameter of the top 34 is about as great as the diameter of the hole 33, and therefore the top will seal in the position according to FIG. 1, while the wings allow passage of the flushing medium when the element 26 is pushed rearwardly towards the nozzle 24. The rear (lower) ends of the wings 36 and the cone 35 lie in about the same plane. The house 27 is provided with a groove 37 intended to receive a pin 42 when being mounted in the bit 1. Each wing includes an inner edge 36a facing toward the center portion and engaged by an end of the spring 25.

The check valve 23 is mounted in the following manner. The top 34 of the cone is pushed into the recess 31 in the house 27. The spring 25 is inserted into the recess 31 such that one end of the spring abuts against the inside of the wings 36. Then an O-ring 40 is pushed over the thread 28 and against the screw head, and thereafter the nozzle 24 is threaded to the house 27 to compress the O-ring against the house. Then the end of the check valve 23, having the hole 33, is inserted into the second channel 22, see FIG. 1, until the groove 37 coincides with a recess in the drill bit whereafter a pin 42 can be inserted into the groove 37 to lock the check valve in the channel 22. Furthermore, the design of the nozzle 24 provides for a high velocity and focused air stream for flushing the borehole bottom which increases the drilling speed.

Figure 4:
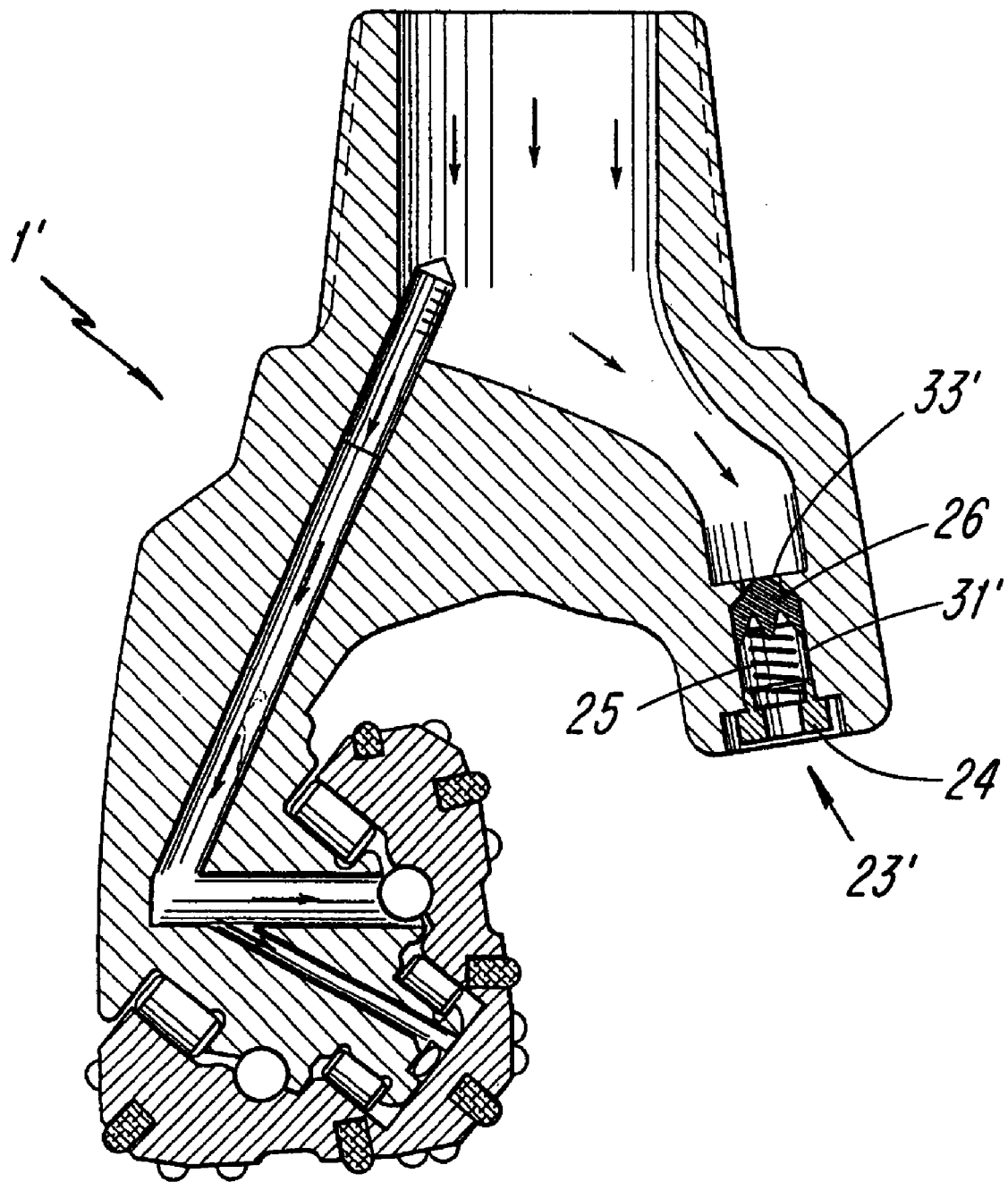
FIG. 4 shows an alternative embodiment of a rotary drill bit according to the present invention.

In FIG. 4 there is shown an alternative embodiment of a rotary drill bit 1' according to the present invention. What distinguishes this drill bit from the above-described drill bit is that the function of the house 27 of FIGS. 1–3 now is performed by the steel body of the drill bit, i.e., the body of the bit forms the hole 33' that is closed by the valve element 26, the discharge recess 31' comprises a boring in the drill bit, and the guide wings 36 contact a wall of that recess directly. The nozzle 24 is threaded to internal threads formed in the recess 31'.

When pressurized air is activated, the element 26 will, due to its being biased closed by the spring, cause an internal pressure build-up of flushing medium within the bit which primarily forces the flushing medium through channels 21 and 18 for cleaning the bearing system. When fluid pressure exceeds the power of the spring 25, the element 26 will be forced towards the nozzle 24 allowing the flushing medium to flow past the top 34 and the wings 36. Thus air can flush away drill cuttings about the drill bit rollers 12. The check valve 23, 23' comprises no links or hinges that can be subjected to metallic fatigue. The cone wings 36 project outwardly and rearwardly far enough such that abutment thereof against the nozzle will occur before maximum compressing of the spring occurs. In addition, the diameter of the spring is greater than the diameter of the cone 35 at the location where the cone is intersected by the lower edges 36a of the wings 36. Thus, the spring contacts the inner edges 36a of the wings at locations intermediate the radial inner and outer ends of the wings. Thus, fluid can flow on each side of an imaginary cylinder formed by the spring, so the spring never obstructs the flow of the flushing medium. The conical portion 35 efficiently counteracts the formation of cavitation in the flushing medium. Cavitation is otherwise a cause for severe blasting damages in conventional rotary drill bits.

Thus, in accordance with the present invention, the nozzle 24 defines a downstream end of a discharge recess 31 or 31' for flushing medium, the upstream end of which recess is defined by the hole 33 or 33'. The valve element 26 is disposed upstream of the nozzle 24 for opening and closing the discharge recess and is guided for linear movement along a center axis A of the discharge recess by engagement between the guide wings 36 and a sidewall of the discharge recess. That sidewall is formed either by the house 27 (in FIG. 2), or by the body of the drill bit (in FIG. 3). The present invention thus relates to a rotary drill bit and a check valve wherein the drill bit bearing is flushed substantially clean before drilling is resumed, wherein the check valve does not break due to metallic fatigue and wherein blasting damage caused by cavitation in the flushing medium are reduced.

Although the present invention has been described in connection with preferred embodiments thereof it will be appreciated by those skilled in the art that additions, modifications, deletions, and substitutions not specifically described may e made without departing from the spirit and scope of the invention as defined in the appended claims.

What is claimed is:

1. A rock-crushing rotary drill bit comprising:
   a bit body forming at least one leg; and
   a rotatable roller rotatably mounted on the at least one leg by bearings, the roller including rock crushing elements;

the bit body further including:
 an external thread adapted for connecting the bit body to a drill tube,
 a main channel for conducting flushing medium,
 a first flushing channel passing through the at least one leg and communicating with the main channel for conducting flushing fluid therefrom to flush the bearings,
 a second flushing channel communicating with the main channel and including a discharge recess for discharging flushing medium from the bit body, the discharge recess defining a linear center axis,
 a nozzle disposed at a downstream end of the discharge recess for directing flushing medium in a direction to flush-away cuttings, and
 a valve element disposed at an upstream end of the discharge recess and including a guide structure for guiding the valve element in linear movement along the center axis, the valve element being spring-biased to a closed state for closing the discharge passage, and being yieldable in response to fluid medium pressure acting thereagainst, for opening the discharge recess.

2. The rotary drill bit according to claim 1, further including a spring for biasing the valve element to the closed state, one end of the spring abutting the nozzle.

3. The rotary drill bit according to claim 1 wherein an upstream end of the discharge recess is defined by a hole having a conical seat toward which the valve element is biased in a direction away from the nozzle.

4. The rotary drill bit according to claim 3 wherein the valve element includes a semi-spherical top engageable with the seat, and a conical portion extending from the semi-spherical portion and pointing toward the nozzle.

5. The rotary drill bit according to claim 2 wherein the valve element is arranged to move toward and abut against the nozzle while compressing the spring during movement toward the open state, the valve element contacting the nozzle before the spring reaches a state of maximum compression.

6. The rotary drill bit according to claim 1 wherein the guide structure comprises laterally projecting wings spaced angularly apart.

7. The rotary drill bit according to claim 6 wherein there are four wings spaced apart by ninety degrees.

8. A check valve adapted for use in a rotary drill bit, comprising:
 a hollow house forming a discharge recess defining a linear center axis, a hole disposed at a first end of the house,
 a nozzle mounted to a second end of the house,
 a valve element disposed in the discharge recess and spring biased toward the hole, the valve element including a guide structure engageable with a sidewall of the discharge recess for guiding the valve element for linear movement along the center axis.

9. The check valve according to claim 8 further including a coil spring disposed in the discharge recess for biasing the valve element against the hole, one end of the coil spring engaging the nozzle, and another end of the coil spring engaging the valve element, wherein the coil spring is compressed during opening of the valve element.

10. The check valve according to claim 9 wherein the valve element is configured to abut against the nozzle before the coil spring reaches a state of maximum compression during opening of the valve element.

11. The check valve according to claim 9 wherein the house forms a conical seat for the hole, the valve element including a semi-spherical portion arranged to abut the seat.

12. The check valve according to claim 11 wherein the valve element includes a conical portion projecting from the semi-spherical portion toward the nozzle.

13. The check valve according to claim 8 wherein the guide structure comprises laterally extending wings engageable with a sidewall of the discharge recess.

14. The check valve according to claim 13 further including a coil spring for biasing the valve element toward the closed state, one end of the coil spring engaging the nozzle, and an opposite end of the coil spring engaging the valve element at a location between the conical portion and the wings.

15. The check valve according to claim 13 wherein there are four of the wings spaced angularly apart by ninety degrees.

16. The check valve according to claim 8 wherein the nozzle is connected to the house by a screw thread.

17. A check valve element adapted for use in a rock-crushing rotary drill bit, the check valve element including a center portion defining a longitudinal center axis, a first longitudinal end of the center portion including a substantially semi-spherical sealing portion, a substantially conical portion extending from the sealing portion and pointing toward a second longitudinal end of the center portion, a plurality of guide wings projecting radially outwardly from the center portion and spaced circumferentially apart, each wing including an inner edge facing the center portion and forming an oblique angle with the longitudinal axis.

* * * * *